(12) United States Patent  (10) Patent No.: US 7,515,602 B2
Shin  (45) Date of Patent: Apr. 7, 2009

(54) INTEGRATED WEB BROWSING SERVICE APPARATUS AND METHOD THEREOF

(75) Inventor: Sang-Cheol Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 932 days.

(21) Appl. No.: 10/445,085

(22) Filed: May 27, 2003

(65) Prior Publication Data

US 2004/0078286 A1    Apr. 22, 2004

(30) Foreign Application Priority Data

Oct. 18, 2002    (KR) .................... 10-2002-0063934

(51) Int. Cl.
| | |
|---|---|
| H04L 12/66 | (2006.01) |
| H04H 20/67 | (2008.01) |
| H04L 12/28 | (2006.01) |
| H04L 12/56 | (2006.01) |
| G06F 15/16 | (2006.01) |
| G06F 17/00 | (2006.01) |

(52) U.S. Cl. ................... 370/463; 370/339; 370/401; 709/219; 715/239

(58) Field of Classification Search ............ 370/401; 455/412; 709/227
See application file for complete search history.

(56) References Cited

U.S. PATENT DOCUMENTS

| | | | | |
|---|---|---|---|---|
| 6,501,421 | B1* | 12/2002 | Dutta et al. | 342/357.13 |
| 6,571,237 | B1* | 5/2003 | Eschner et al. | 707/4 |
| 6,763,226 | B1* | 7/2004 | McZeal, Jr. | 455/90.2 |
| 2001/0056444 | A1 | 12/2001 | Ide et al. | 707/513 |
| 2002/0081997 | A1* | 6/2002 | Morishima | 455/412 |
| 2002/0087701 | A1* | 7/2002 | Siikaniemi | 709/227 |
| 2002/0087704 | A1* | 7/2002 | Chesnais et al. | 709/228 |
| 2002/0099727 | A1* | 7/2002 | Kadyk et al. | 707/201 |
| 2003/0041157 | A1* | 2/2003 | Linsley | 709/230 |
| 2003/0119527 | A1* | 6/2003 | Labun et al. | 455/456 |

(Continued)

FOREIGN PATENT DOCUMENTS

JP    2001-292270    10/2001

(Continued)

OTHER PUBLICATIONS

"Siemens SL42 GPRS WAP Phone" Internet Article, 'Online!' Aug. 2, 2002, XP002266623 Retrieved from the Internet: <URL:http://web.archive.org/web/20020802060323/http://www.cellular.co.za/phones/siemens/2001/siemens/2001/siemens_s142_gprs.htm> retrieved on Jan. 12, 2004!

(Continued)

*Primary Examiner*—Hassan Kizou
*Assistant Examiner*—Andrew Chriss
(74) *Attorney, Agent, or Firm*—Ked & Associates Inc.

(57) ABSTRACT

An apparatus and method for providing an integrated web browsing service integrates a general web browsing function with a mobile web browsing function. Through this integration, various web content and web services are provided to the user. Also, additional equipment or interface installation for a mobile web service is not required for terminal equipment, and it is possible to recover or otherwise compensate for display limitations of a mobile terminal. The integrated web browsing service apparatus includes terminal equipment which performs Internet web browsing and mobile communication web browsing, and a mobile terminal which performs web browsing by itself or for supporting web browsing of the terminal equipment by connecting an Internet server and an mobile communication web server.

38 Claims, 16 Drawing Sheets

U.S. PATENT DOCUMENTS

2004/0012627 A1* 1/2004 Zakharia et al. ............. 345/744
2004/0042450 A1* 3/2004 Monroe et al. ............. 370/389

FOREIGN PATENT DOCUMENTS

| WO | WO 0025497 A1 * | 5/2000 |
| --- | --- | --- |
| WO | WO 00/44183 | 7/2000 |
| WO | WO 00/76173 | 12/2000 |
| WO | WO 0076230 A1 * | 12/2000 |

OTHER PUBLICATIONS

Garg V K et al: "Mobile IP for 3G wireless networks" IEEE ICPWC' 2000, Dec. 17, 2000, pp. 240-244, XP010534050.

"Connect Your PSION: Mobile Communications" Internet Article, 'Online!' Nov. 27, 2001, XP002266624 Retrieved from the Internet: <URL:http://web.archive.org/web/20011127183629/http://www.psion.com/mobile> 'retrieved on Jan. 12, 2004!'.

Office Action dated Oct. 5, 2005 in Japanese Patent Application No. 2003-31784.

* cited by examiner

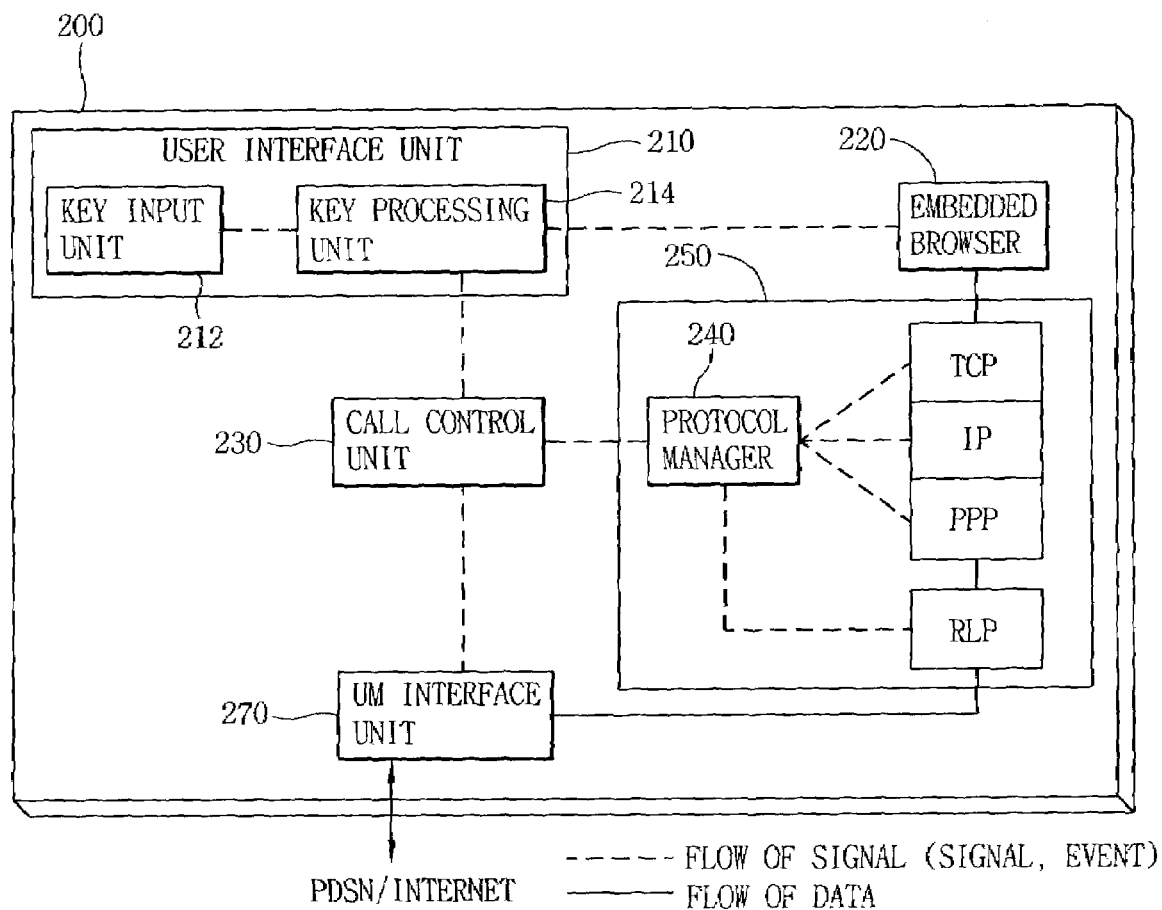

INTEGRATED WEB BROWSING SERVICE APPARATUS AND METHOD THEREOF

BACKGROUND OF THE INVENTION

1. Field of the Invention

The present invention relates to a mobile communication terminal, and in particular to an apparatus and method for providing a web browsing service for a mobile communication terminal.

2. Background of the Related Art

Web browsing methods performed for a terminal equipment (TE), such as a personal computer (PC) or a personal digital assistant (PDA), and web browsing methods performed for a mobile terminal (MT) are implemented differently depending upon functional and display format interface aspects.

In a TE web browsing method, the MT performs the function of a modem or a network card. The MT and TE are connected with each other by an Rm interface, which provides physical connectivity between the TE and the MT, and this has to be implemented in both the TE and MT. Physical connection between the TE and MT can be provided by modes such as a serial communication port (RS-232C), an USB, an IrDA, an IEEE1394, and a Bluetooth.

From a software viewpoint, the TE requires an interface such as a telephone connection network and a PPP (point-to-point) protocol. In addition, in order to perform web browsing, a web browser is required such as an Internet Explorer developed by MICROSOFT Company or Netscape developed by NETSCAPE Company.

Unlike the TE, an Rm interface is not required in an MT web browsing method. Instead, protocols such as PPP, an internet protocol (IP), a transmission control protocol (TCP), and a user datagram protocol (UDP) most be implemented, and the MT contacts a web server (hereinafter referred to as a 'mobile server') using those protocols. In order to perform web browsing, the MT must have an embedded browser such as a UP browser or an ME browser.

FIG. 1A is a block diagram showing a conventional TE which performs web browsing. The TE includes a telephone connection network 170, an Rm interface unit 160, and a browser 120. The telephone connection network performs a network connection function through a modem. The Rm interface unit provides a physical connection between the TE and an MT 200 and performs functions for the physical connection such as bit stream generation and error processing. And, the browser performs data upload/download by contacting a web server based on an Internet protocol. A user interface unit 110 is also included.

The telephone connection network 170 includes a connection control unit 130 and a protocol unit 150. The connection control unit performs functions such as a network connection set, connection release, and connection management. The protocol unit sets a physical connection with protocols of the other station, disconnects, and manages the connection, and transmits/receives protocol signals and data through the set connection. The protocol unit 150 includes a protocol manager 140 for managing a state and activity of protocols such as the PPP, IP and TCP.

FIG. 1B is a block diagram of an MT, which performs web browsing. The MT includes an interface block 290, an AT command parser 280, a call unit 230, and a protocol unit 250. The interface block includes an interface unit 260 and an Um interface unit 270. The AT command parser analyzes and processes commands of the TE 100 transmitted through the Rm interface unit 260. The call control unit secures a channel for a call setting with the network, disconnects the channel, and performs related call processing functions. The protocol unit sets a physical connection with a mobile server, releases, and manages the connection, and transmits/receives data through the physical connection. An embedded browser 220 is also included for performing data upload/download by contacting the mobile server. A user interface unit 210 including of a key input unit 212 and a key processing unit 214 outputs event data received from other parts of the MT 200 as audio-video formats. The protocol unit 250 includes protocols such as a radio link protocol (RLP), PPP, IP, and TCP and a protocol manager 240 manages those protocols. An AT command is an instruction list of the TE 100 for controlling the MT 200.

FIG. 2A is a block diagram showing a connection format when the TE 100 performs web browsing through the MT 200. When a user commands the TE 100 to set a data call, the telephone connection network constructs an AT command for call setting and transmits it to the Rm interface unit 160. The Rm interface unit converts the AT command into a bit stream and transmits it to the MT through a physical transfer channel. The MT 200 interprets the bit stream and makes the call control unit 230 try a data call setting. When the data call is set, the call control unit informs the TE of the call setting. The TE tries a PPP connection and a TCP/IP connection. When the trial is successful, the TE informs the user of the web-server connection though a display. And, the user performs web browsing by operating the TE web browser such as Internet Explorer or Netscape.

FIG. 2B is a block diagram showing how the MT 200 performs during web browsing. When the user operates the embedded browser 220 of the MT 200 by pressing a certain key, the key processing unit 214 transmits a certain message for making the call control unit 230 try a data call to the call control unit 230. When the data call is set, the protocol unit 250 sequentially performs connection with the mobile server, RLP, PPP, IP and the TCP protocol. When the connection is performed, web page data is downloaded from the mobile server, and an output processing unit (not shown) outputs the downloaded data through the display.

The conventional TE uses the MT as means for contacting to the Internet (or PSDN). However, it cannot contact the mobile server and the MT cannot contact a general web server based on the Internet protocol. In addition, the MT cannot use various resources of the TE related to web contents. Furthermore, while a CPU, a memory and the display of the MT 200 have proven to be appropriate for voice and text processing, the mobile server cannot provide various services to the MT 200 and accordingly it is difficult to construct various web contents. Moreover, it is noted that the PPP, IP, TCP, UDP protocols and network-related resources are implemented in TE and MT. These duplicated resource implementations may lower development efficiency and increase development costs.

SUMMARY OF THE INVENTION

An object of the invention is to solve at least the above problems and/or disadvantages and to provide at least the advantages described hereinafter.

Another object of the present invention to provide a method and apparatus which performs an integrated web-browsing service by contacting an Internet web server and a mobile communication web server through a mobile communication terminal.

In order to achieve these and other objects and advantages, the present invention provides an apparatus for providing a web browsing service, which includes a TE (terminal equipment) which performs Internet web browsing and mobile communication web browsing and a MT (mobile terminal) for performing web browsing by itself or supporting web browsing of the TE by contacting an Internet server and an mobile communication web server.

The TE includes a user interface unit for receiving a command or selection content from a user; an integrated browser for performing Internet web browsing or mobile communication web browsing according to a user's selection; a network control unit for providing various services to the user and controlling connection with the MT through the browser; and a Rm interface unit for providing physical connection between the network control unit and the MT.

The MT includes an embedded browser for performing mobile communication web browsing according to a user's selection; a network control unit for providing various services to the user and controlling connection with the TE through the embedded browser; and a Rm interface unit for providing physical connection between the network control unit and the TE.

In order to achieve the above-mentioned object, a web browsing service method in accordance with the present invention includes setting connection between a TE (terminal equipment) and a MT (mobile terminal) by a connection request from the TE; setting a call between the MT and a network when the connection between the TE and the MT is set; transmitting an integrated web service activating message to the TE when the call is set; uploading/downloading data by contacting the TE to an Internet server or a mobile communication web server through the set call; ending the call when the connection between the TE and the server is finished; and transmitting an integrated web service deactivating message to the TE when the call is finished and ending the connection between the TE and the MT.

BRIEF DESCRIPTION OF THE DRAWINGS

FIG. 2B is a block diagram illustrating relations among the construction parts in performing of the web browsing in the MT;

DETAILED DESCRIPTION OF PREFERRED EMBODIMENTS

Figure 3:
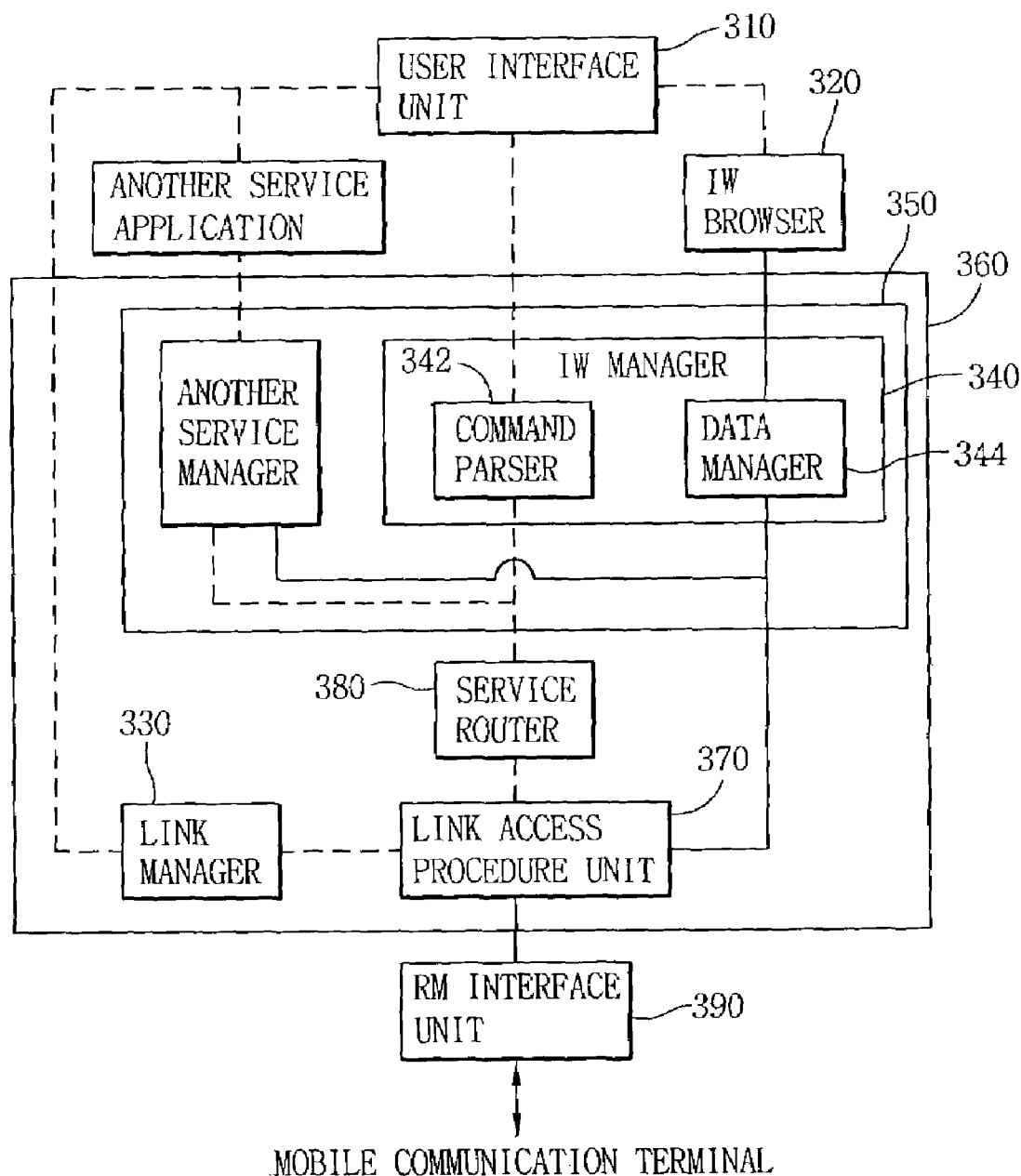
FIG. 3 is a block diagram illustrating relations among construction parts of a TE in accordance with the present invention.

FIG. 3 shows a TE in accordance with one embodiment of the present invention. This TE 300 includes a user interface unit 310, an integrated web browser 320, and a Rm interface unit 390. A network control unit 360 includes a service management unit 350, a service router 380, a link manager 330, and a link access procedure unit 370. The user interface unit and Rm interface unit may operate in a manner similar to units 110 and 160.

The integrated web browser 320 (hereinafter referred to as an 'IW browser') interprets not only a general web-page generation language such as a HTML but also a mobile-web page generation language such as a WML and a cHTML which is displayed in an appropriate mode. As a result, the IW browser can perform both the general web-browsing function and a mobile web-browsing function through a single interface.

The service management unit 350 performs start, end, management, connection set and other services such as a schedule management service, a telephone book service, and a web-browsing service by being linked with those service elements. In order to implement these functions, each service manager includes a command parser and a data manager, or elements having similar functions. The service management unit 350 also includes an integrated web-service manager 340 and other service managers.

The integrated web service manager 340 (hereinafter referred to as an 'IW service manager') includes a command parser 342 for interpreting a command from the IW browser 320 or the user interface unit 310 and a data manager 344 for transmitting data to the IW browser 320 or transmitting data from the IW browser 320 to a subordinate layer.

The other service managers provide services received through a PC-sync such as the schedule management service and the telephone book service, in addition to the integrated web browsing service. These managers may have the same structure with that of the integrated web service manager 340, and functions of construction parts may differ according to related services.

The other service managers provide services received through a PC-sync such as the schedule management service and the telephone book service, in addition to the integrated web browsing service. These managerial may have the same structure with that of the integrated web service manager 340, and functions of construction parts may differ according to related services.

The link access procedure unit 370 provides physical connectivity between the TE 300 and the MT 400, performs framing and deframing so as to transmit/receive a superior message or data.

The Rm interface unit 390 provides physical connectivity between the TE 300 and the MT 400. The Rm interface is preferably implemented as serial communication using a UART, a Bluetooth, an IrDA, an USB, etc.

The user interface unit 310 serves as an interface between the user and TE for receiving a user command or user selection content from the user or for transmitting a processing result, etc., to the user.

Figure 4:
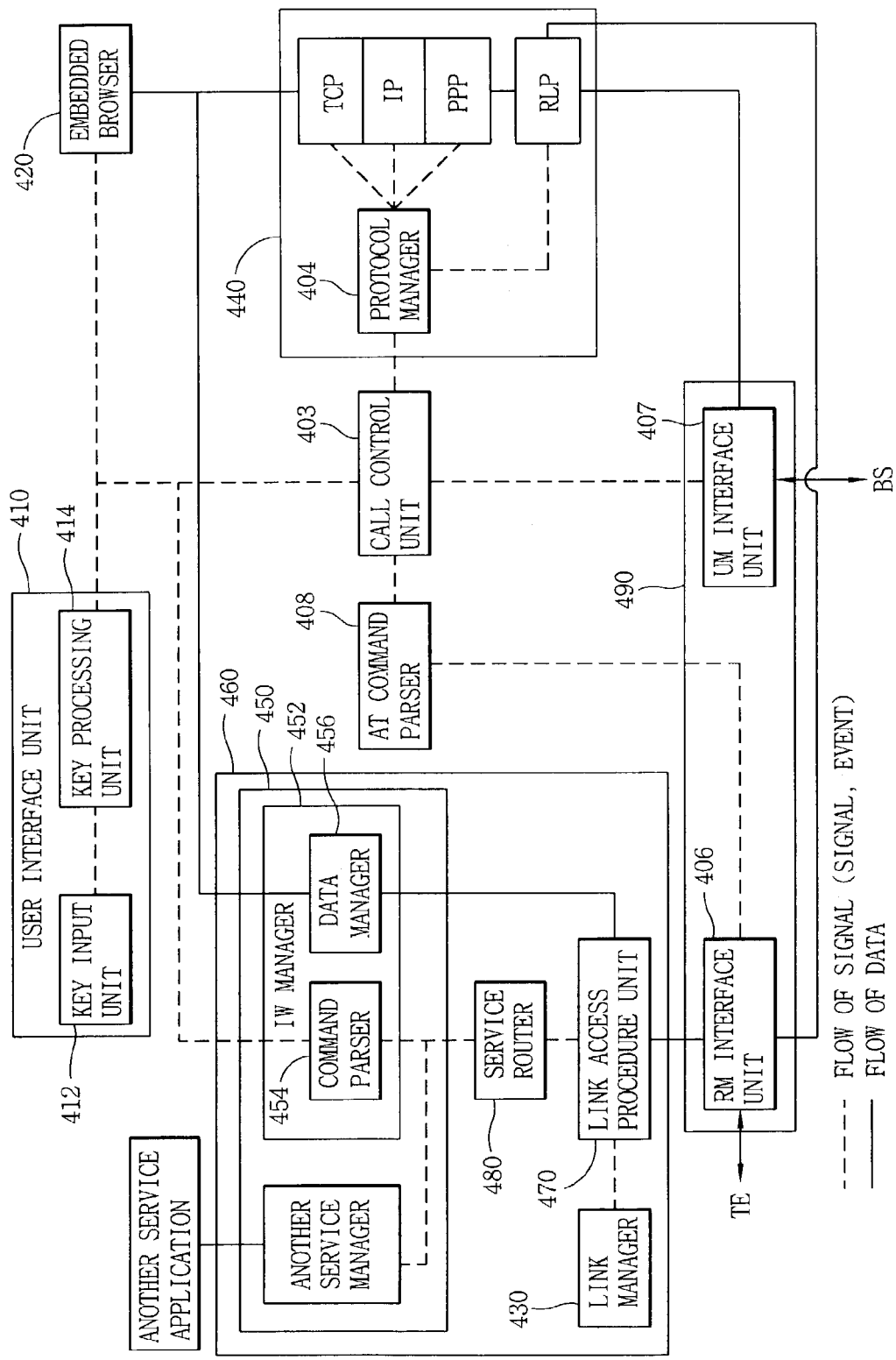
FIG. 4 is a block diagram illustrating a structure of a MT (mobile terminal) in accordance with the present invention.

FIG. 4 shows a preferred structure of the MT 400 in accordance with the present invention. As depicted, the MT includes a user interface unit 410, an embedded browser 420, a protocol unit 440, a call control unit 403 and an interface block 490. The network control unit 460 includes a service manager 450, a service router 480, a link manager 430 and a link access procedure unit 470.

The embedded browser 420 performs a web-browsing function. More specifically, the browser, contacts a mobile web site, outputs contents of the web site, and moves to a URL (uniform resource locator) designated by the user.

The protocol unit 440 includes protocol elements such as TCP, IP, PPP, RKP, etc. and a protocol manager 404 for managing them.

The call control unit 403 performs call processing for contacting the mobile communication network through the Um interface unit 407 and performs functions such as call setting, call releasing, etc.

The network control unit 460 preferably performs the same function in the MT 400 as the function of the network control unit 360 in the TE 300.

The interface block 490 includes the Rm interface unit 406 and the Um interface unit 407, the Rm interface unit 406 preferably performs the same function as that of the Rm interface unit 390 in the TE 300. The Um interface unit 407 provides physical connectivity with the mobile communication network through a base station.

The user interface unit 410 preferably performs the same function as that of the user interface unit 310 of the TE 300 and includes a key input unit 412 and a key processing unit 414. The key input unit receives a key input through a keypad of the MT and converts it to a pertinent key event. The key processing unit processes the key event input from the key input unit according to status of the MT.

Figure 1A:
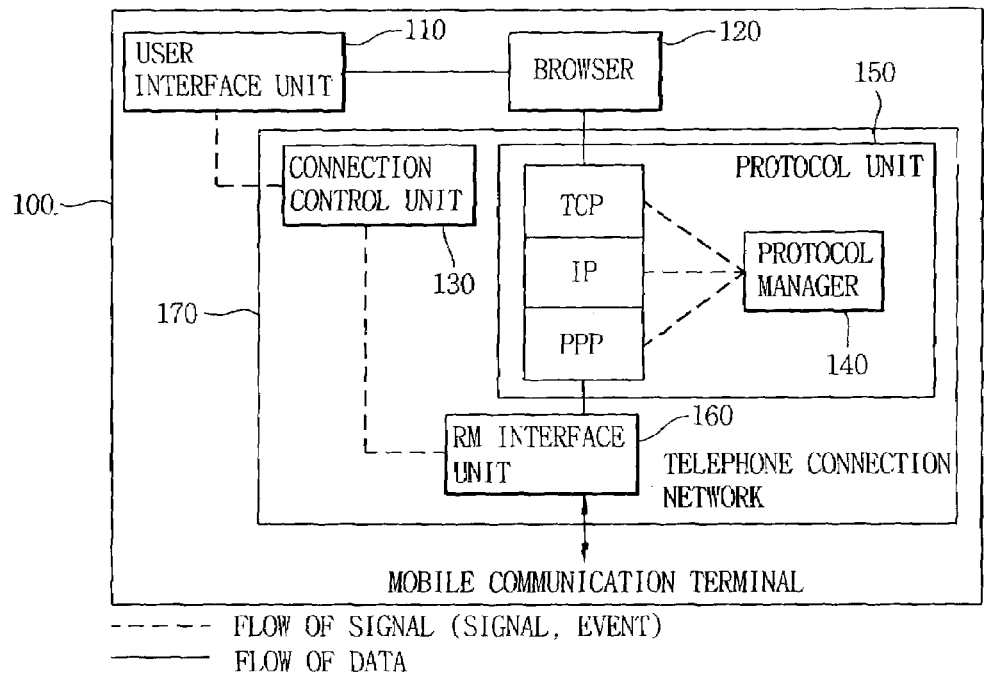
FIG. 1A is a block diagram illustrating a construction of the conventional TE (terminal equipment) related to web browsing.
Figure 1B:
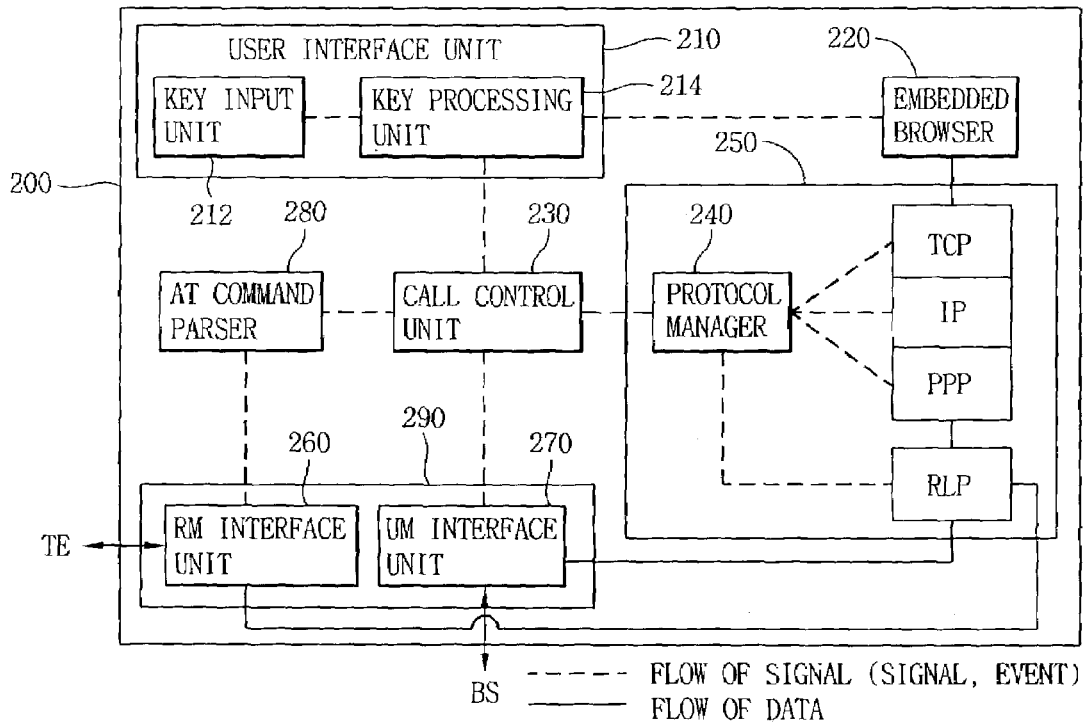
FIG. 1B is a block diagram illustrating a construction of the conventional MT (mobile terminal) related to web browsing.
Figure 2A:
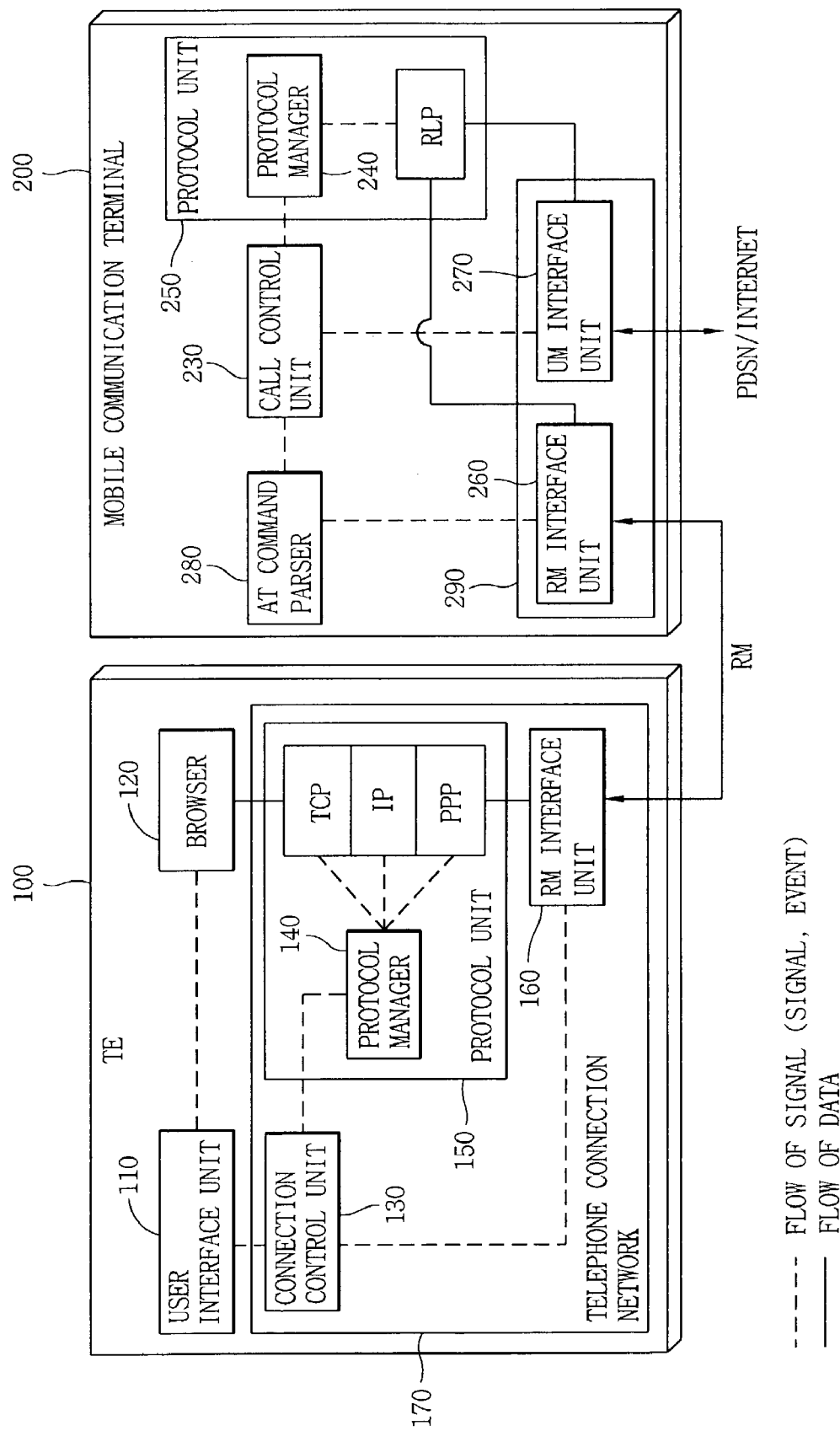
FIG. 2A is a block diagram illustrating relations among construction parts when the TE performs the web browsing through the MT.

The TE and the MT perform framing or deframing of a message (or data) for providing physical connectivity therebetween. The user interface unit, AT command parser, call control unit, protocol unit, and interface block may operate in a manner similar to those shown in FIG. 1B.

Figure 5A:
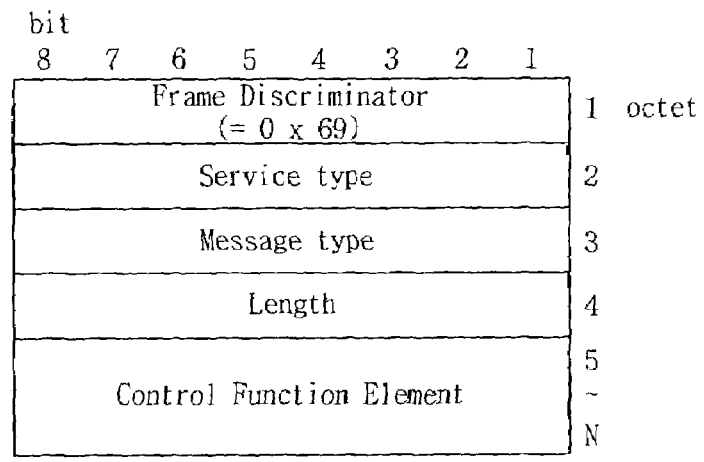
FIG. 5A illustrates a message frame structure for physical link set between the TE and the MT or transmission/reception of command defined by each service manager.
Figure 5B:
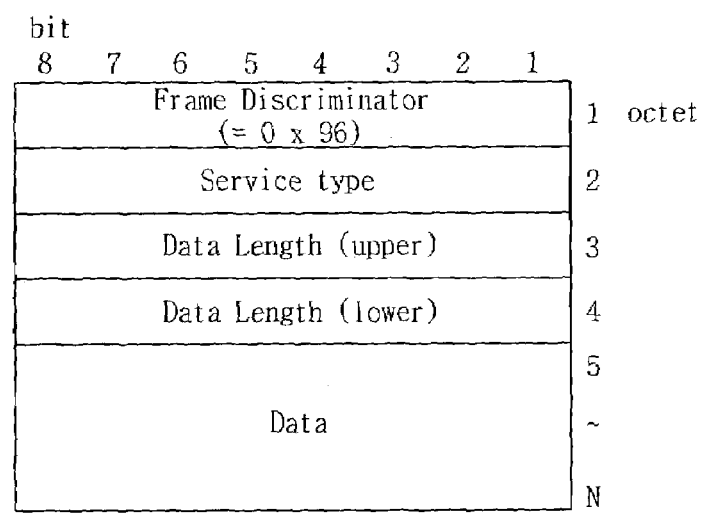
FIG. 5B illustrates a data frame structure for transmission/reception of data.
Figure 5C:
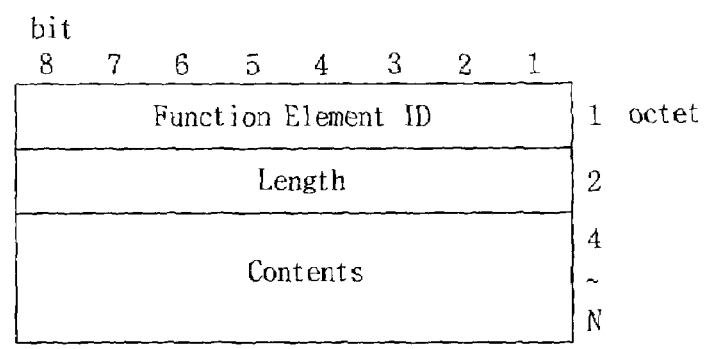
FIG. 5C illustrates a frame structure for control function element added to the message frame in FIG. 5A.

FIG. 5A illustrates a message frame structure for a physical link set between the TE and MT or transmission/reception of command defined by each service manager. FIG. 5B illustrates a data frame structure for transmission/reception of data. And, FIG. 5C illustrates a frame structure for a control function element added to the message frame in FIG. 5A. As depicted in these figures, a frame in accordance with an embodiment of the present invention includes a frame-discriminator field, a service-type field, a message-type field, a data-length field, a data field, a length field and a control function element field.

The frame discriminator field is for discriminating whether the frame is a message frame or a data frame. When a field value is "0x69", the frame is considered to be a message frame, and when the field value is "0x96" the frame is considered to be a data frame.

The service-type field is for indicating a message frame or a data frame transmission/reception service type. When a field value is "0x00" the service type of the frame is considered to be an integrated web-browsing service, when the field value is "0x01" the service type is considered to be a schedule management service, and when the field value is "0x02" the a service type is considered to be a telephone book service. In addition, to these service types, when other service types are added code values within 0x03-0xFF are allocated to those services.

The message-type field is for transmission/reception message. Message types in accordance with the present invention include, but are not necessarily limited to, those set forth in Table 1.

TABLE 1

| Code | Message name | Direction | Note | Required Control function element |
|---|---|---|---|---|
| 0x01 | Connect request | TE → MT | Connection set request between the TE and MT | |
| 0x02 | Connect complete | TE ← MT | Connection set between the TE and the MT | |
| 0x03 | Connect reject | TE ← MT | The connection request from the TE is rejected by the MT | Reject Cause |
| 0x04 | Disconnect request | TE ←→ MT | Connection release between the TE and the MT | |
| 0x05 | Disconnect Ack | TE ←→ MT | Connection release inform | |
| 0x06 | Status request | TE → MT | Status information request about the MT | |
| 0x07 | Status | TE ← MT | Status information of the MT | Status |
| 0x08 | Service start | TE → MT | Service start by the TE | |
| 0x09 | Service activated | TE ← MT | Activating the service in the MT | |
| 0xa | Service stop | TE → MT | Service end by the TE | |
| 0xb | Service deactivated | TE ← MT | Deactivating the service by the MT | |
| 0xc~ | Defining additional messages later | | | |

The data length field is for storing a length (byte unit) of a data field. The data field is for storing actual transmitted/received data. The length field is for storing a total length (byte unit) of a control function element in a message frame.

The control-function element field is preferably added to the end of a message frame in order to indicate information added to the message. The control function element field includes a function element ID field, a length field, and a contents field.

With reference to Table 2, the function element ID field is an identifier for discriminating a control-function element. The length field is for storing a length (byte unit) of the contents field. With reference to Table 3, the contents field is for storing data corresponding to the control function element.

TABLE 2

| Code | Control Function Element | Note | Related message |
|---|---|---|---|
| 0x01 | Cause | Pertinent message occurrence cause | Connect reject |
| 0x02 | MT status | Status information of the MT | Status |
| 0x03~ | Define additionally later | | |

TABLE 3

| Code | Cause | Note |
|---|---|---|
| 0x01 | Unusable | The user does not select a pertinent function set |
| 0x02 | Already use | Already in connection state |
| 0x03 | Not acceptable | The MT can not process a pertinent message |
| 0x04 | Invalid frame | Invalid frame |
| 0x05~ | Define additional messages later | |

Status information of the MT 400 to be transmitted to the TE 300 includes information such as a telephone number, call state information (informing whether it is in a call communication state) and information for informing whether the MT 400 supports the integrated web browsing service, etc., and a construction method thereof follows a table in FIG. 5C. However, kinds, locations of information to be provided and a coding method are determined according to a development intention.

TABLE 4

| Primitives | direction |
|---|---|
| FE-service_start_req | CP → SR |
| FE-service_start_ind | SR → CP |
| FE-service_act_req | CP → SR |
| FE-service_act_ind | SR → CP |
| FE-service_stop_req | CP → SR |
| FE-service_stop_ind | SR → CP |
| FE-service_deact_req | CP → SR |
| FE-service_deact_ind | SR → CP |

\* SR: Service router
\* CP: Command parser
(a) Primitives between Service router ~ Command parser

| Primitives | direction |
|---|---|
| DL-service_start_req | SR → LAP |
| DL-service_start_ind | LAP → SR |
| DL-service_act_req | SR → LAP |
| DL-service_act_ind | LAP → SR |
| DL-service_stop_req | SR → LAP |
| DL-service_stop_ind | LAP → SR |
| DL-service_deact_req | SR → LAP |
| DL-service_deact_ind | LAP → SR |

\* SR: Service router
\* LAP: Link Access Procedure for IW
(b) Primitives between Service router ~ LAP-IW

| Primitives | direction |
|---|---|
| CALL_CONNECT_REQ | CP → CC |
| CALL_CONNECT_COMP | CC → CP |
| CALL_DISCONNECT_REQ | CP → CC |
| CALL_DISCONNECT_ACK | CC → CP |

\* CC: Call Control
\* CP: Command Parser
(C) Primitives between Call control unit ~ Command parser

| Primitives | direction |
|---|---|
| MDL-connect_req | LM → LAP |
| MDL-connect_ind | LAP → LM |

TABLE 4-continued

| MDL-connect_ack | LM → LAP |
|---|---|
| MDL-connect_comp | LAP → LM |
| MDL-connect_rej | LM ←→ LAP |
| MDL-Status_req | LM → LAP |
| MDL-Status_ind | LAP → LM |
| MDL-Status_rep | LM → LAP |
| MDL-Status_cfm | LAP → LM |

\* LAP: Link Access Procedure for IW
\* LM: Link Manager
(d) Primitives between Link Manager ~ LAP-IW

| Primitives | direction |
|---|---|
| CONNECT_REQ | UI → LM |
| CONNECT_COMP | LM → UI |
| CONNECT_REJ | LM → UI |
| DISCONNECT_REQ | UI → LM |
| DISCONNECT_COMP | LM → UI |
| STATUS_REQ | UI → LM |
| STATUS_CFM | LM → UI |

\* UI: User interface
\* LM: Link Manager
(e) Primitives between UI ~ Link Manager Table 4 shows primitives transferred between the construction parts of the TE 300 and the MT 400. A message is transmitted between the TE 300 and the MT 400 as a frame format. On the other hand, a primitive is a signal transmitted between each construction part of the TE 300 and the MT 400 and has a meaning for itself. The structure of the primitive can be varied or subtracted/added according to a development intention.

Figure 6:
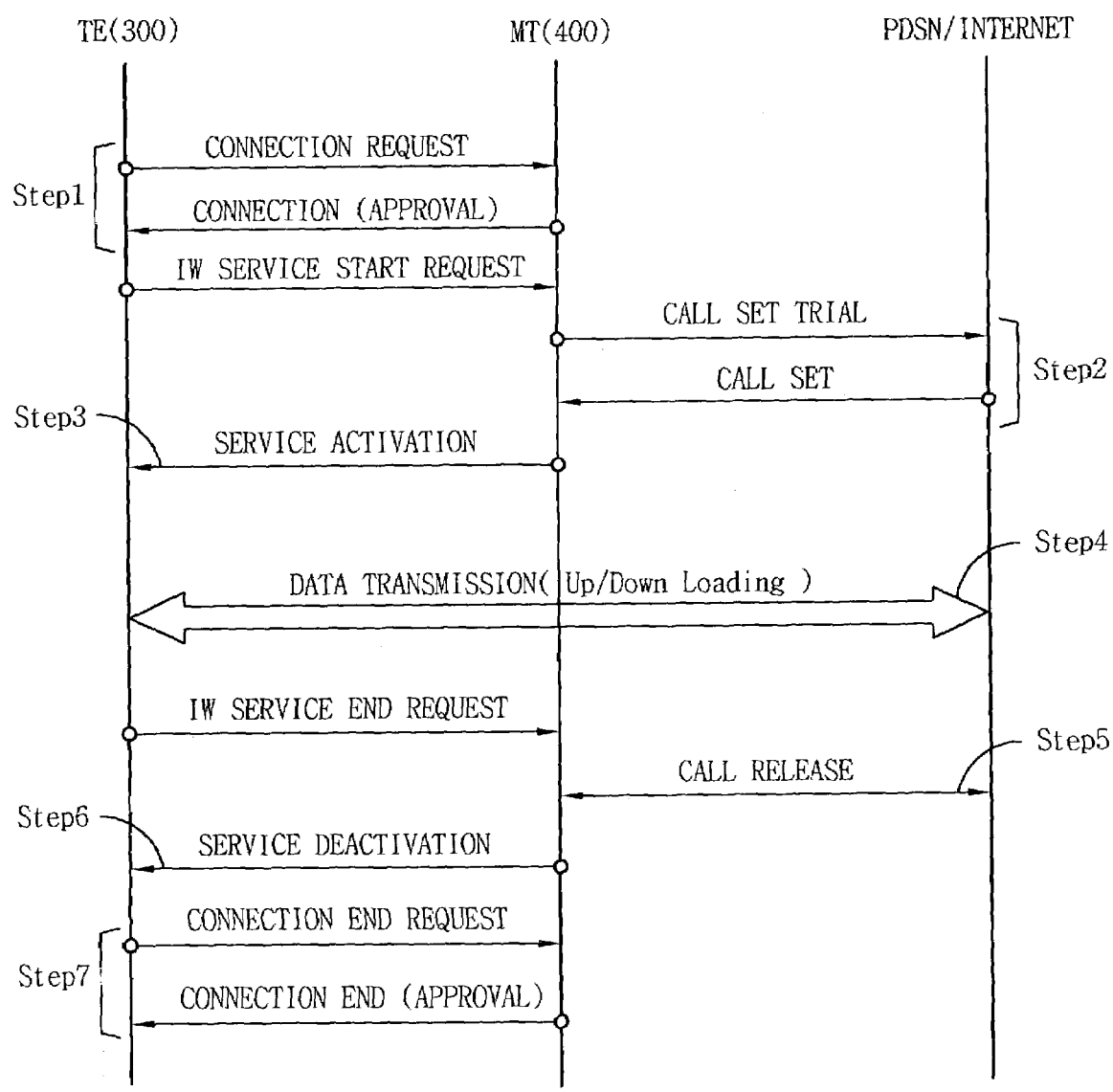
FIG. 6 illustrates a processing procedure for performing a web browsing service between the TE and the MT in accordance with the present invention.

FIG. 6 illustrates a processing method for performing a web browsing service between the TE and the MT in accordance with one embodiment of the present invention. This method includes setting a connection between the TE 300 and the MT 400 by a connection request of the TE 300 as shown at step S1, setting a call between the MT 400 and the network as shown at step S2, and transmitting a web-service activating message to the TE 300 as shown at step S3. Next, the TE 300 is connected to the Internet server or the mobile communication web server and data is uploaded/downloaded through the set call as shown at step S4. Additional steps include disconnecting the call when the connection between the TE 300 and the server is ended as shown at step S5, transmitting an integrated web service deactivating message to the TE 300 as shown at step S6, and disconnecting the connection between the TE 300 and the MT 400 as shown at step S7.

In order to download request information or data from the web server, the TE 300 first tries to connect with the MT 400. When the TE is connected to the MT, the TE transmits a start request message about the integrated web browsing service to the MT.

Upon receiving the start request message of the TE, the MT tries a call setting with the network. When the call is set, the MT transmits a service activating message to the TE. The TE receives the message and starts data uploading/downloading in the request web server.

When the integrated web browsing is finished, the TE transmits an end request message about the integrated web browsing service to the MT. The MT disconnects the call setting with the network and transmits a deactivating message about the integrated web browsing service to the TE.

When the TE receives the service deactivating message, it disconnects the connection with the MT by transmitting a disconnect request message to the MT 400. However, when the user of the TE requests another service (for example:

schedule management service through the PC-Sync, telephone book service, etc.), the connection between the TE and the MT is maintained.

In order to provide an integrated web browsing service according to the present invention, connection setting signaling between the TE and the MT, integrated web-service start/end signaling (or data transmission/reception signaling), disconnection signaling, and connection management signaling are defined.

Figure 7A:
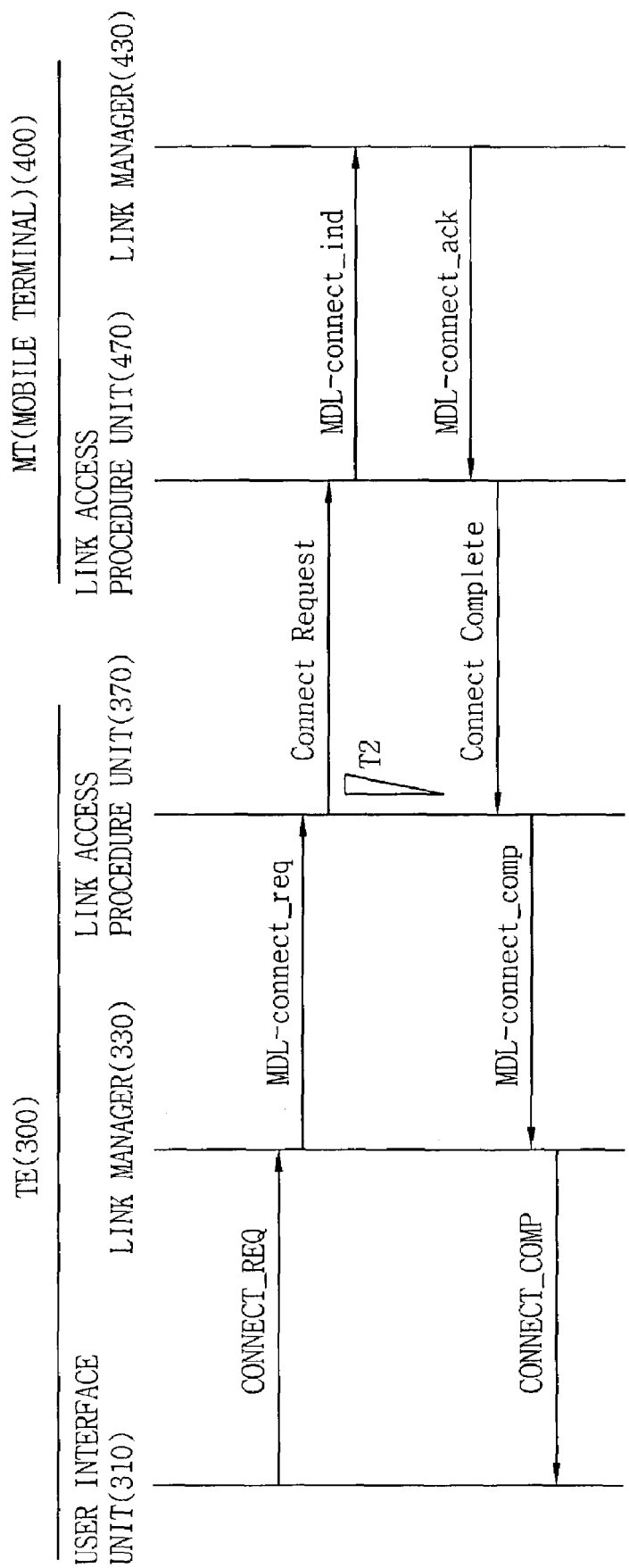
FIG. 7A illustrates the MT approves a connection request of the TE.
Figure 7B:
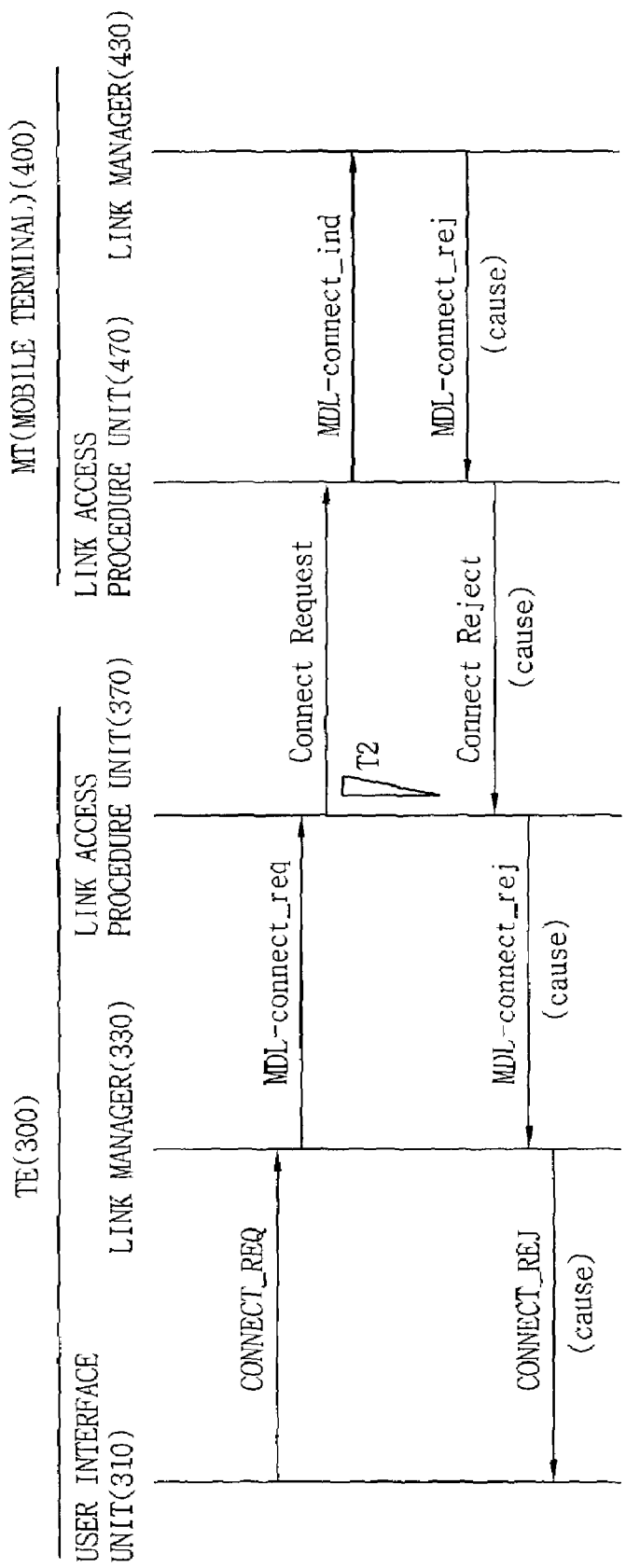
FIG. 7B illustrates the MT rejects a connection request of the TE.

FIGS. 7A and 7B illustrates the connection setting signaling and a flow of connection setting messages (request, approval, and rejection) and primitives among construction parts of TE and MT.

The connection setting signaling is performed between the TE and the MT in order to provide the schedule management service through the PC-Sync, the telephone book service and the integrated web service, etc. to the user. When the connection setting signaling is performed successfully, the TE and MT are connected with each other physically.

FIG. 7A illustrates a procedure when the MT approves the connection request of the TE. When a "connection command" of the user is transmitted to the user interface unit 310, the user interface unit transmits a primitive related to connection setting to the link manager 330 and the link manager 330 transmits it to the link access procedure unit 370. The link access procedure unit receives the primitive (MDL-connect_req) from the link manager and transmits a connect request message to the link access procedure unit 470 of the MT through the Rm interface units 390 and 406. When the connection request message is received from the TE, the link access procedure unit transmits a connection set primitive (MDL-connect_ind) to the link manager 430.

When the MT is in a connectable state, the link manager 430 transmits a connection approval primitive (MDL-connect_ack) to the link access procedure unit 470, and the link access procedure unit transmits a connection complete message to the link access procedure unit 370 of the TE through the Rm interface units 406 and 390. When the connection complete message is received from the MT, the link access procedure unit transmits a primitive about the connection approval to the link manager 330, and the link manager 330 transmits it to the user interface unit 310. Through that process, the TE and the MT are connected with each other physically.

FIG. 7B illustrates a process when the MT rejects a connection request of the TE. When the connection request message of the TE is received and the MT is not in the connectable state, the link manager 430 transmits a connection reject message primitive (MDL-connect_rej) to the link access procedure unit 470, and the link access procedure unit transmits a connection reject message to the link access procedure unit 370 of the TE through the Rm interface units 406 and 390. When the connect reject message is received from the MT, the link access procedure unit 370 transmits a primitive about the connection reject to the link manager 330, and the link manager transmits it to the user interface unit 310. Through the process, the TE judges whether the connection request is rejected. Primitives related to the connection set signaling are defined in Table 4.

When the MT does not provide the integrated web browsing function presented in accordance with the present invention, the TE judges whether the connection request is rejected when the user releases the integrated web browsing function, the MT cannot receive the connection set request, or the TE does not receive reply for a certain time (ΔT1) after transmitting a connection request message to the MT. When the TE and the MT are connected with each other, the TE performs a start signaling and an end signaling of the integrated web service.

Figure 8:
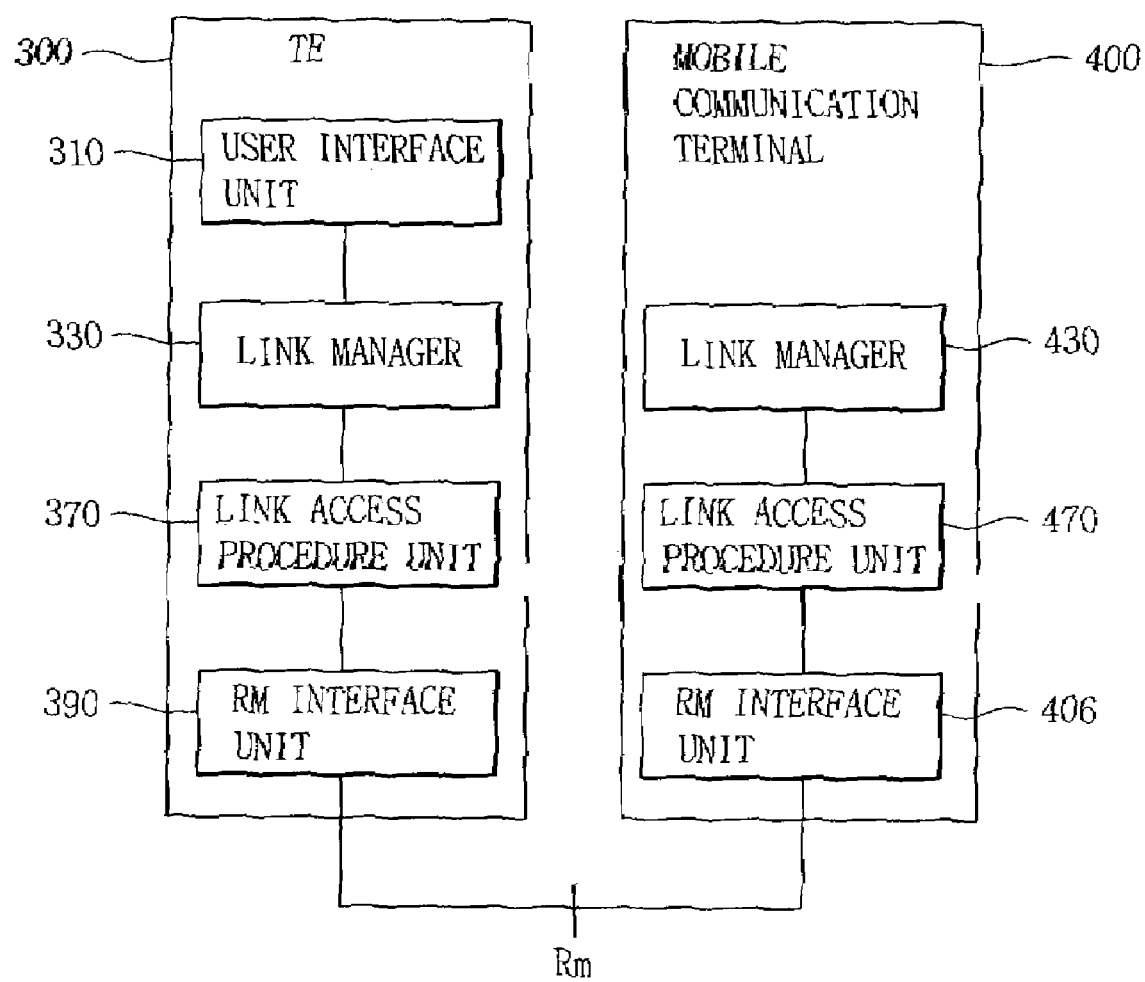
FIG. 8 is a block diagram illustrating construction parts related to signaling in FIG. 7 and relations among them.

FIG. 8 is a block diagram illustrating construction parts related to signaling in FIG. 7 and relations among them. As stated above, when the TE and MT are connected with each other, the present invention provide the user of the TE not only IW web service but also a schedule management service through the PC-Sync, telephone book service, etc.

Figure 9:
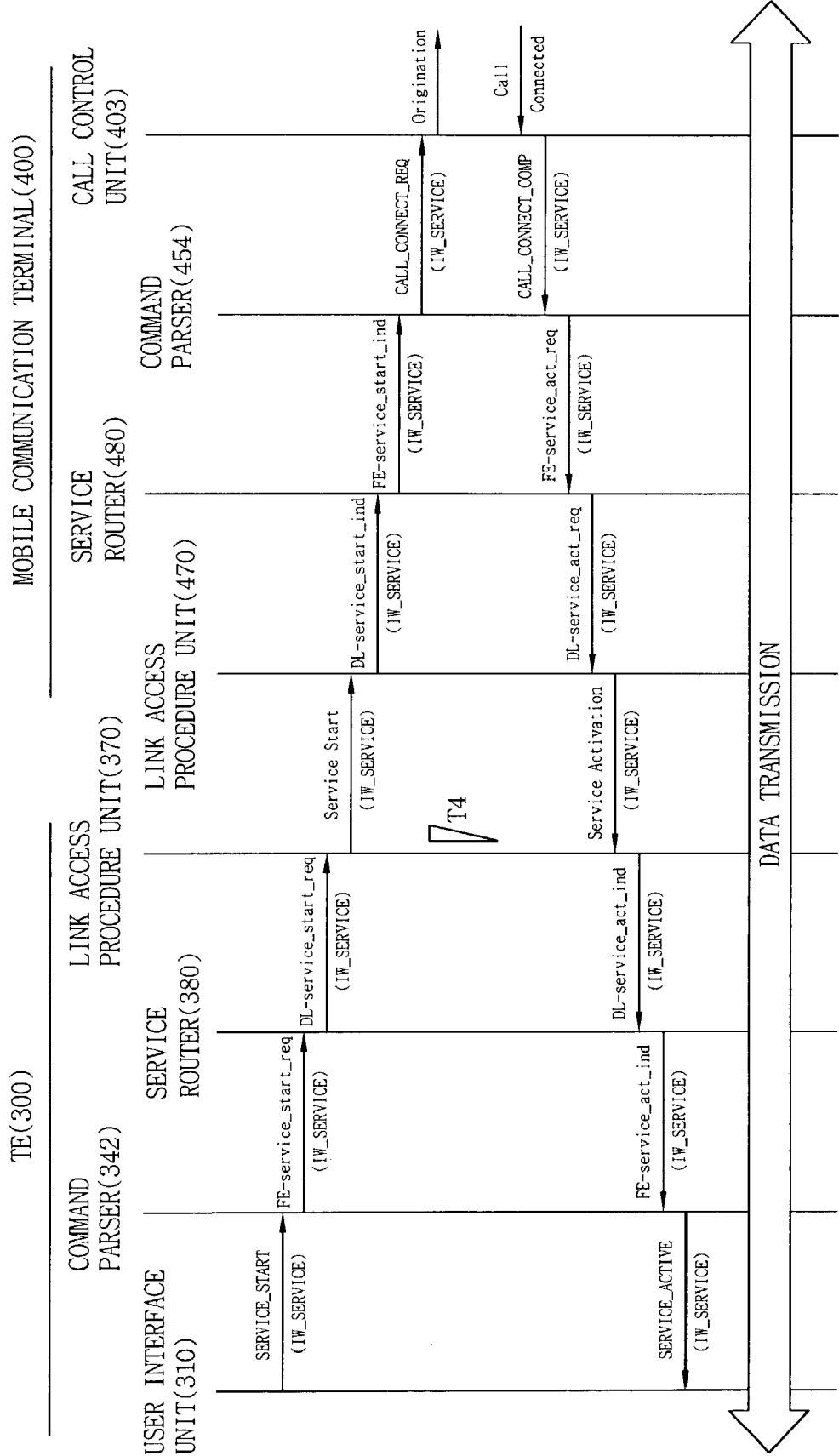
FIG. 9 illustrates a start signaling of an integrated web service.

FIG. 9 illustrates the start signaling of the integrated web service. When the TE and the MT are connected with each other, according to command of the user, the user interface unit 310 transmits a primitive about the service start to the command parser, the command parser transmits it to the service router 380, and the service router transmits it to the link access procedure unit 370. Upon receiving the primitive (DL-service_req) of the service router 380, the link access procedure unit transmits a service start message to the link access procedure unit 470 of the MT through the Rm interface units 390 and 406.

When the service start message is transmitted from the TE, the link access procedure unit 470 transmits the primitive about the service start to the service router 480, the service router transmits it to the command parser 454, and the command parser transmits it to the call control unit 494. When the primitive (call-connect_req) of the command parser 454 is received, the call control unit 492 tries to establish a call connection with the network. When the call is connected, it transmits a primitive about the service activation in the reverse direction of the service start signaling path. Primitives related to the start signaling of the integrated web service are defined in Table 4.

When the service start signaling is performed successfully, the TE can perform data transmission/reception with not only the general web server based on the Internet protocol but also the mobile server. A frame structure generated by the link access procedure unit 370, 470 for data transmission/reception is the same with the frame structure in FIG. 5B.

Figure 10:
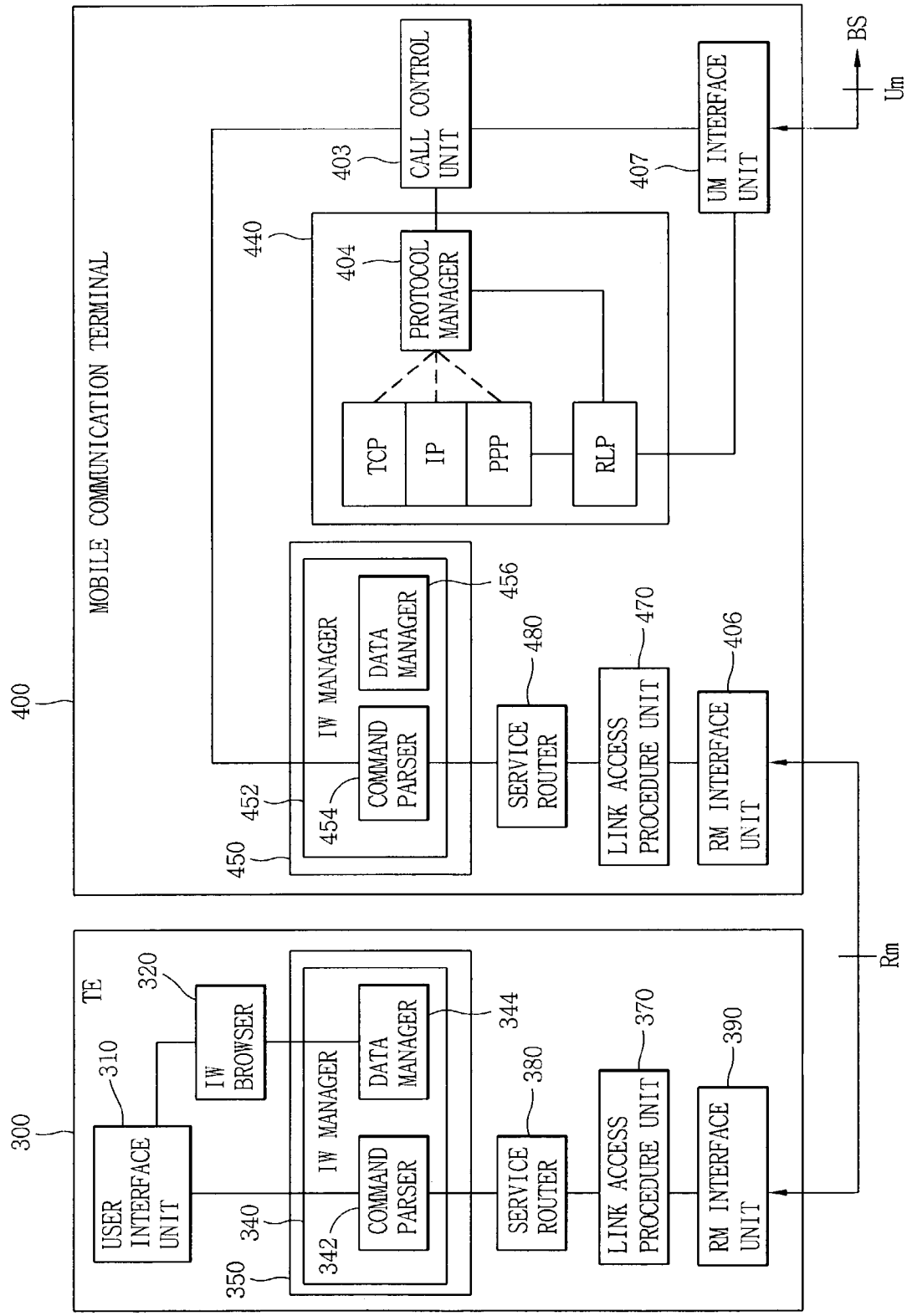
FIG. 10 is a block diagram illustrating construction parts related to the start signaling in FIG. 9 and relations among them.

FIG. 10 is a block diagram illustrating construction parts related to the start signaling in FIG. 9 and relations among them. The construction parts depicted in FIG. 10 are related to the integrated web browsing service in the mobile communication network and the Internet network, when the connection with the network is set, data transmission/reception with the terminal can be performed through the network.

Figure 11:
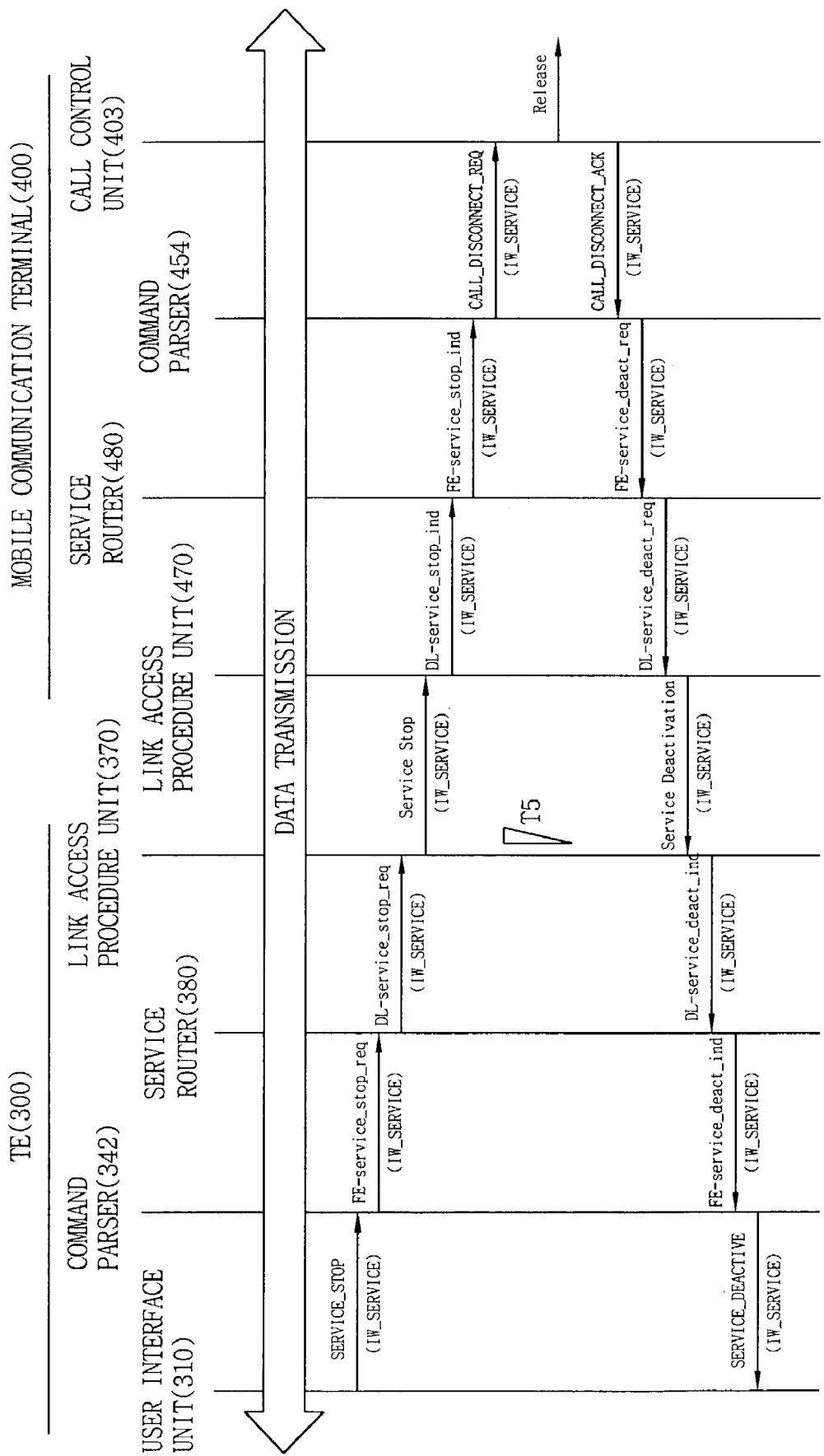
FIG. 11 illustrates an end signaling of the integrated web service.

FIG. 11 illustrates an end signaling of the integrated web service. When the integrated web service is ended according to a user's request or the call connection fail of the call control unit 492 or other causes of the TE, the end signaling is performed. In addition, after the TE transmits the service start message and there is no reply from the MT for a certain time (ΔT4), the TE judges whether the integrated web service start signaling has failed. When the integrated web service is ended due to those causes, the user interface unit 310 transmits the primitive about the service end to the command parser 342, the command parser transmits it to the service router 380, and the service router transmits it to the link access procedure unit 370. Upon receiving the primitive (DL-service_stop_req) from the service router 380, the link access procedure unit transmits a service end message to the link access procedure unit 470 of the MT through the Rm interface units 390 and 406.

When the service end message is received from the TE, the link access procedure unit 470 transmits the primitive about the service end to the service router 480, the service router transmits it to the command parser 454, and the command parser transmits it to the call control unit 494. When the primitive (call-connect_req) of the command parser 454 is received, the call control unit 492 tries to establish a call connection with the network. When the call is connected, the construction parts transmit a primitive about the service activation in the reverse direction of the service start signaling path. Primitives related to the integrated web service end signaling are defined in Table 4.

Figure 12:
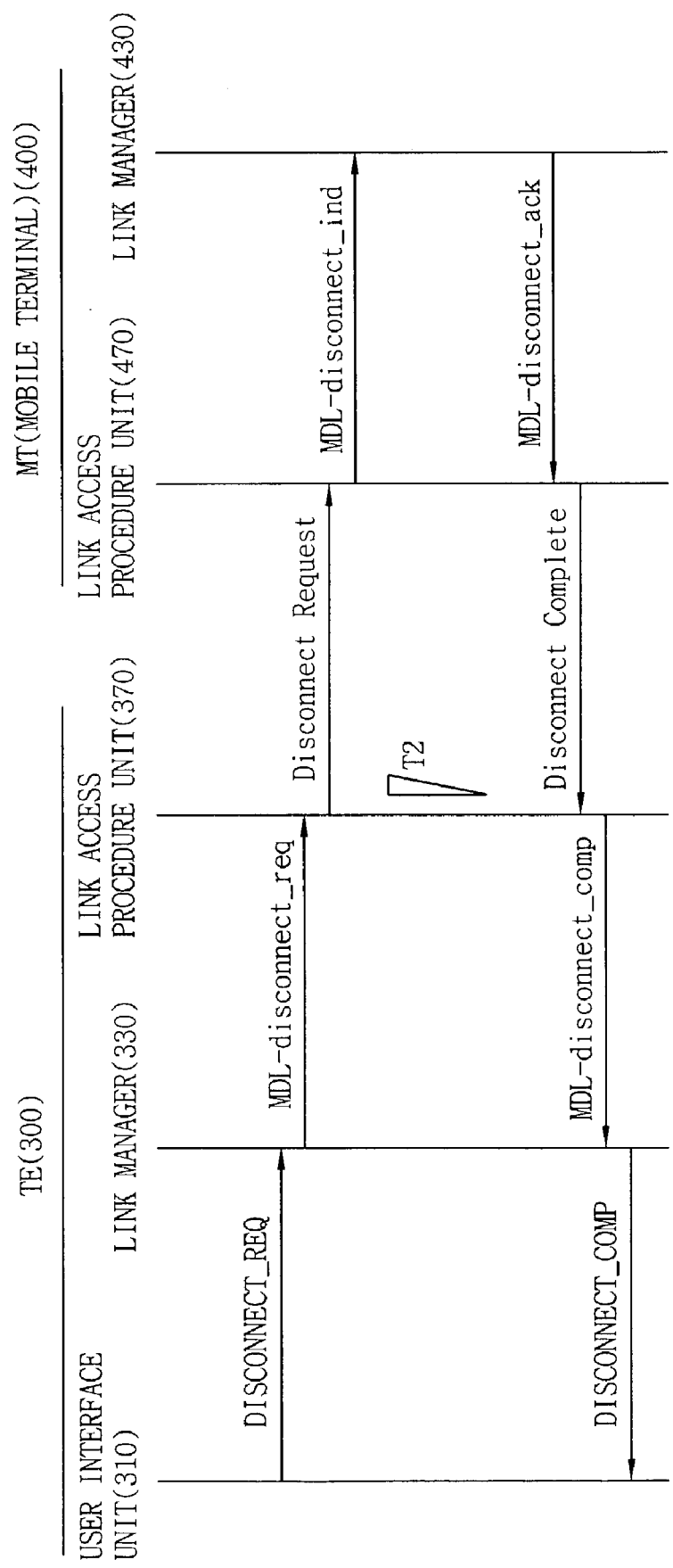
FIG. 12 illustrates a connection release signaling.

FIG. 12 illustrates the connection release (end) signaling. When the user ends the IW browser 320 or the other connection release reasons occur, the TE 300 disconnects the connection with the MT 400 by performing the connection end signaling. If there is no reply from the MT for a certain time (ΔT2), the TE judges whether the connection with the MT has ended. The process of the connection end signaling will be described.

When the "connection end command" is transmitted from the user to the user interface unit 310, the user interface unit transmits a primitive about the connection end to the link manager 330 and the link manager transmits it to the link access procedure unit 370. The link access procedure unit receives the primitive (MDL-disconnect_req) of the link manager 330 and transmits a connection end message to the link access procedure unit 470 of the MT through the Rm interface units 390 and 406. When the connection end message is transmitted from the TE, the link access procedure unit 470 transmits a connection end primitive (MLD-disconnect_ind) to the link manager 430.

When the connection end primitive (MLD-disconnect_ind) is received, the link manager 430 transmits a connection end approval primitive (MLD-disconnect_ack) to the link access procedure unit 470, and the link access procedure unit transmits a disconnect complete message to the link access procedure unit 370 of the TE.

When the disconnect complete message is transmitted from the MT, the link access procedure unit 370 transmits a primitive about the connection end approval to the link manager 330, and the link manager transmits it to the user interface unit 310. Through the process, the connection between the TE and the MT is ended. Primitives related to the connection end are defined in Table 4. FIG. 8 is a block diagram illustrating construction parts related to the connection end signaling and relations among them.

Figure 13:
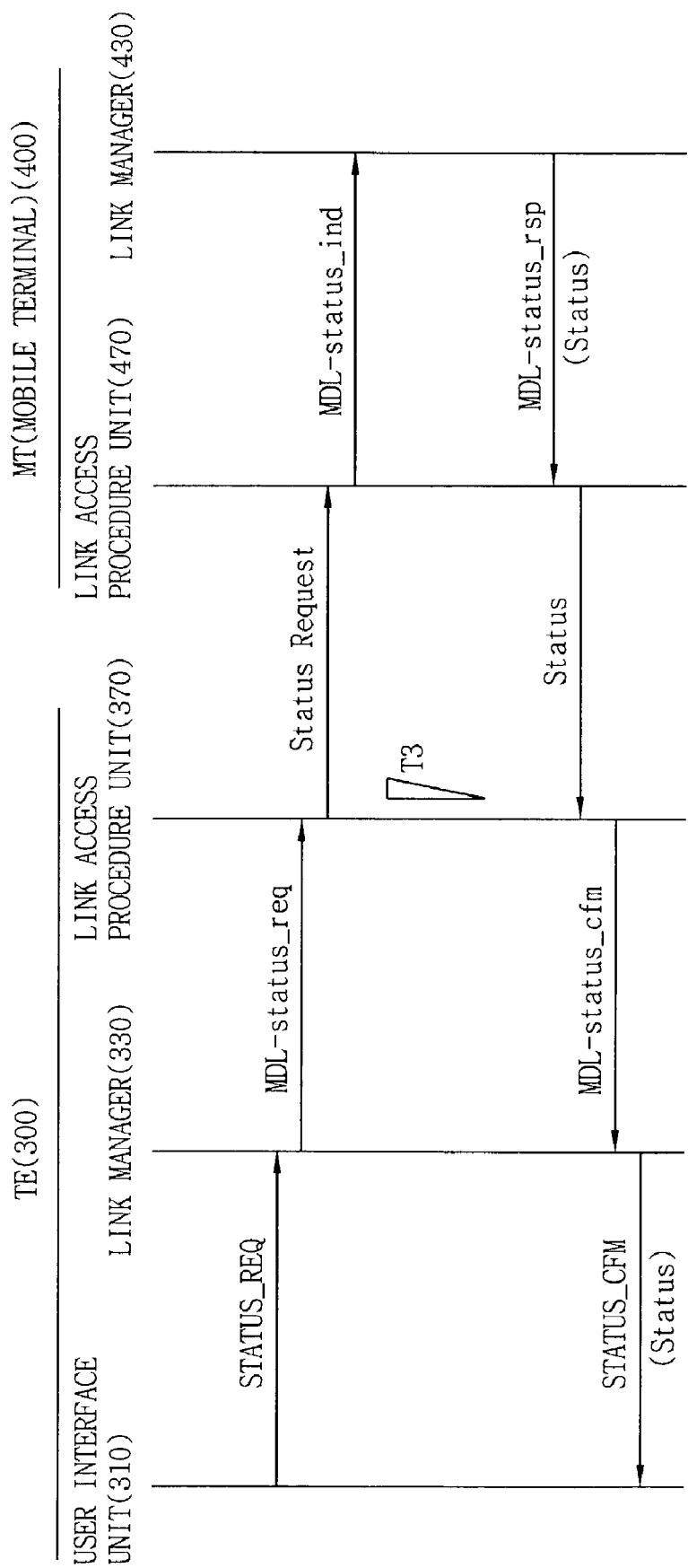
FIG. 13 illustrates a state management signaling.

FIG. 13 illustrates the state management signaling. When the TE and MT are connected with each other, according to a user's request or a status management schedule, the TE monitors and manages the connection state with the MT periodically. The connection status information is reported to the user as A/V formats.

If the connection between the TE and MT is ended and the user requests the web service continually without recognizing the connection end, the TE performs the connection set signaling and accordingly the connection between the TE and the MT is set again. However, when the user requests the IW browser end, the TE ends the IW browser 320 immediately. Construction parts related to the state management signaling and relations among them is shown, for example, in FIG. 8.

Figure 14:
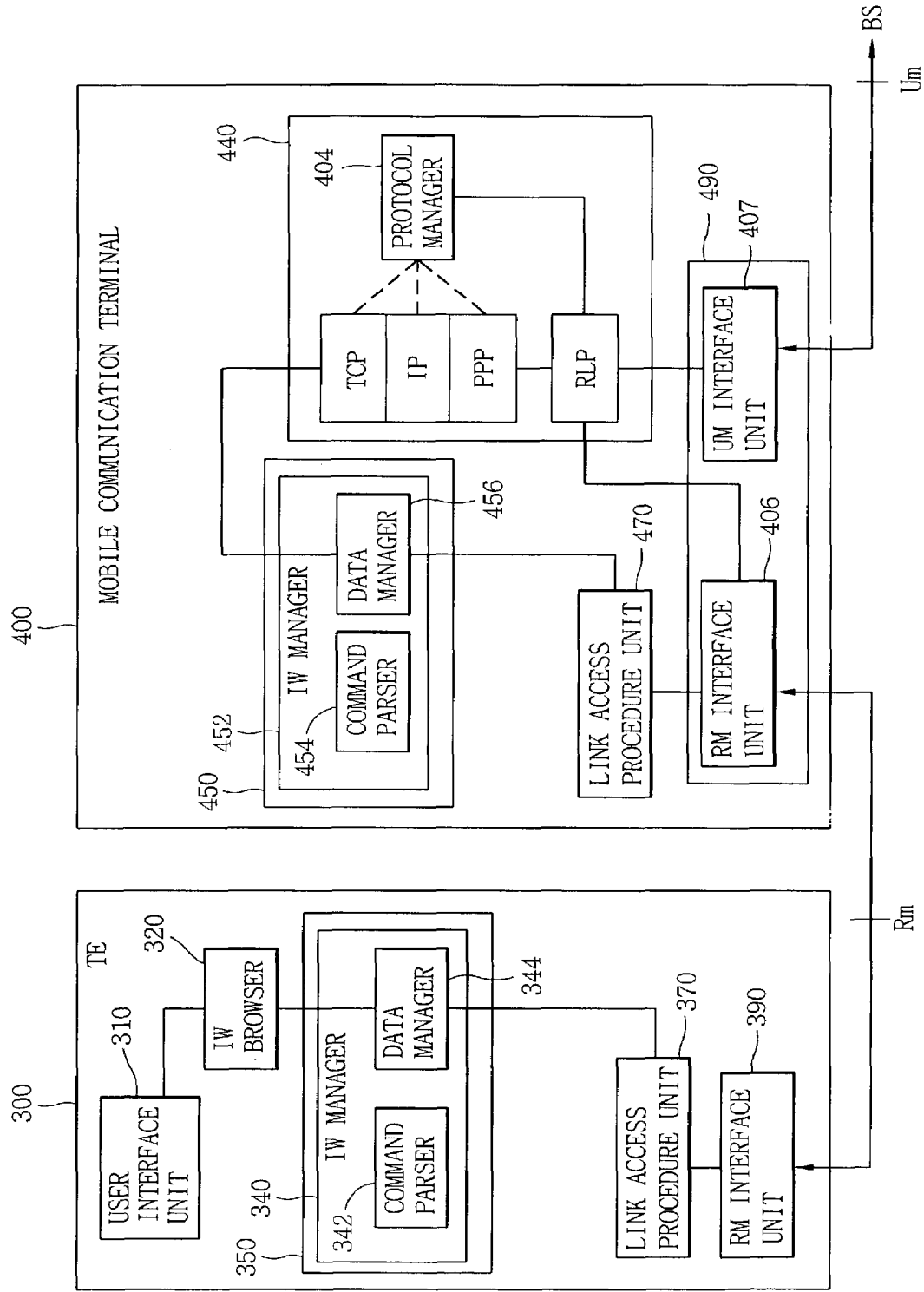
FIG. 14 is a block diagram illustrating construction parts related to data transmission/reception and relations among them.

FIG. 14 is a block diagram illustrating construction parts related to data transmission/reception and relations among them. When the MT supports the integrated web browsing service and the user selects to use the integrated web browsing service function, data received from the network through the protocol unit 440 are transmitted to the TE and are outputted through the IW browser 320. In addition, when the user input content is transmitted from the TE to the MT, the user input content is transmitted to the network through the protocol unit 440.

As described above, in order to provide the integrated web browsing service, the MT preferably performs a mode selection function about usage of the IW browser 320, and more specifically for judging whether the user selects to use the IW browser 320. That function can be implemented as the Boolean (true/false) mode or other modes, and it can be determined by a developer of the MT.

The selected mode value is stored in the TE, and the stored mode value is not changed until 'mode change cause' occurs by the user or the terminal developer.

When 'IW browser unused mode' is set, about the connection set request from the TE for the IW browser 320 usage, the MT transmits a connection reject message to the TE and does not set a connection. And, the IW browser 320 informs the user of the connection reject content as A/V formats.

When 'IW browser use mode' is set, the embedded browser 420 of the MT is deactivated, and all data to be transmitted to the embedded browser 420 are transmitted to the TE.

The integrated web browsing service of the present invention provided between the TE and MT is advantageous in at least the following respects. First, the present invention provides a single medium and a single user interface.

Second, by being linked with the PC-Sync, while the TE performs the web browsing, the MT can perform various services such as the schedule management and the telephone book management, etc. simultaneously.

Third, because there is no need to implement duplicated resources of the TE in the MT, it is possible to reduce a development cost and increase a development efficiency of the MT.

Fourth, additional equipment for providing a mobile web service or an interface installation are not required for the TE, and it is possible to recover a limitation of a display of the MT.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus function clauses are intended to cover the structures described herein as performing the recited function and not only structural equivalents but also equivalent structures.

What is claimed is:

1. An apparatus for providing an integrated web browsing service, comprising:

terminal equipment (TE) which includes a first integrated web service manager and an integrated browser that performs Internet web browsing by interpreting a general web-page generation language and performs mobile communication web browsing by interpreting a mobile web-page generation language; and mobile terminal (MT) which includes a second integrated web service manager and an embedded browser that performs a web-browsing function separate from the TE, the integrated browser of the TE performs said Internet web browsing and mobile communication web browsing through the MT independent of the web-browsing function of the MT, the TE performing control functions for:

contacting an Internet server through the MT when the TE is to perform Internet web browsing, and contacting a mobile communication web server through the MT when the TE is to perform mobile communication web browsing, the TE performing said Internet web browsing through the MT independently from said mobile communication web browsing, and wherein the embedded browser in the MT is deactivated in response to a signal from the TE indicating that the integrated browser in the TE has been selected, and wherein the signal indicating that the integrated browser has been selected is transmitted from the TE under control of the first integrated web service manager in the TE and data to be transmitted to the embedded browser of the MT is controlled by the second integrated web service manager in the MT to be transmitted to the TE after deactivation of the embedded browser.

2. The apparatus of claim 1, wherein the TE includes:
a user interface unit for receiving a command or selection content from a user;
a network control unit for providing one or more services to the user and controlling connection with the MT through the integrated browser; and
a Rm interface unit for providing physical connection between the network control unit and the MT.

3. The apparatus of claim 2, wherein the network control unit includes:
a plurality of service managers for performing services according to a user selection, said service managers including the first integrated web service manager;
a service router unit for transmitting a message from a subordinate layer to one of the service managers;
a link access procedure unit for performing framing, deframing and providing physical connection with the MT as a subordinate layer of the service router unit; and
a link manager for setting, ending and managing the connection with the MT.

4. The apparatus of claim 1, wherein the MT includes:
a network control unit for providing various services to the user and controlling connection with the TE through the embedded browser; and
a Rm interface unit for providing physical connection between the network control unit and the TE.

5. The apparatus of claim 4, wherein the network control unit includes:
a plurality of service managers, including the second web service manager, for providing services according to a user selection;
a service router unit for transmitting a message from a subordinate layer to one of the service managers;
a link access procedure unit for performing framing, deframing and providing physical connection with the TE as a subordinate layer of the service router unit; and
a link manager for setting, ending and managing the connection with the TE.

6. The apparatus of claim 1, wherein the first web service manager includes:
a command parser for interpreting and processing a command from the user interface unit or the integrated browser; and
a data manager for transmitting/receiving data to/from the integrated browser.

7. The apparatus of claim 4, wherein the MT performs a mode selection function for selecting an active mode or inactive mode of the integrated browser.

8. The apparatus of claim 7, wherein the embedded browser of the MT is deactivated when an active mode of the integrated browser is set, and all data to be transmitted/received to/from the embedded browser are transmitted/received to/from the TE.

9. A method for providing an integrated web browsing service, comprising:

setting a connection between a terminal equipment (TE) and a mobile terminal (MT) based on a connection request from the TE;
setting a call between the MT and a network when the connection between the TE and the MT is set;
transmitting an integrated web service activating message to the TE when the call is set;
activating an integrated browser in the TE to perform Internet web-browsing in a first operating mode and to perform mobile communication web browsing in a second operating mode through the MT, said Internet web-browsing in the first operating mode being performed through the MT independently from said mobile communication web browsing in the second operating mode;
transferring data between the TE and an Internet server in said first operating mode, and transferring data between the TE and a mobile communication web server in said second operating mode through the set call;
ending the call when the connection is finished; and
transmitting an integrated web service deactivating, message to the TE when the call is finished and ending the connection between the TE and the MT,
wherein the TE includes a first web service manager and the MT includes a second web service manager, and wherein an embedded browser in the MT is deactivated in response to a signal from the TE indicating that the integrated browser in the TE has been selected, and wherein the signal indicating that the integrated browser has been selected is transmitted from the TE under control of the first integrated web service manager in the TE and data to be transmitted to the embedded browser of the MT is controlled by the second integrated web service manager in the MT to be transmitted to the TE after deactivation of the embedded browser.

10. The method of claim 9, wherein the TE includes:
a user interface unit for receiving a command or selection content from a user;
a network control unit for providing one or more services to the user and controlling connection with the MT, said one or more services including an integrated web browsing service; and
a Rm interface unit for providing a physical connection between the network control unit and the MT.

11. The method of claim 10, wherein the network control unit includes:
a plurality of service managers for performing services according to a user selection, said services managers including the first web service manager;
a service router unit for transmitting a message form a subordinate layer to one of the service managers;
a link access procedure unit for performing framing, deframing and providing a physical connection with the MT as a subordinate layer of the service router unit; and
a link manager for setting, ending and managing the connection with the MT.

12. The method of claim 9, wherein the MT includes:
a network control unit for providing one or more services to the user and controlling a connection with the TE through the embedded browser; and
a Rm interface unit for providing a physical connection between the Network control unit and the TE.

13. The method of claim 12, wherein the network control unit includes:
a plurality of service managers, including the second web service manager, for providing various services according to a user selection;

a service router for transmitting a message form a subordinate layer to one of the service managers;

a link access procedure unit for performing framing, deframing and providing a physical connection with the TE as a subordinate layer of the service router unit; and a link manager for setting, ending and managing the connection with the TE.

14. The method of claim 9, wherein the MT has a mode selection function for selecting an active mode or inactive mode of the integrated browser.

15. The method of claim 14, wherein a connection request of the TE is not approved when a deactive mode of the integrated browser is set in the MT, and the embedded browser of the MT performs web browsing.

16. The apparatus of claim 1, wherein the integrated browser performs said Internet web browsing and said mobile communication web browsing through a single interface of the MT.

17. The apparatus of claim 1, wherein said general web-page generation language is HTML.

18. The apparatus of claim 1, further comprising:
a physical link which carries information between the TE and the MT based on a frame structure that includes a service-type field, wherein an integrated web-browsing service is designated when the service-type field includes a first value and another service is designated when the service-type field includes a second value.

19. The apparatus of claim 18, wherein a schedule management field is designated by the second value in the service-type field.

20. The apparatus of claim 18, wherein a telephone book service is designated by the second value in the service-type field.

21. The apparatus of claim 1, wherein the MT includes:
a circuit to detect whether an integrated-browser mode has been selected in the TE, wherein the embedded browser in the MT is deactivated when the circuit indicates that integrated-browser mode has been selected in the TE.

22. The apparatus of claim 21, wherein the MT executes a service simultaneously with the integrated-browser mode performed in the TE.

23. The apparatus of claim 22, wherein said service is a schedule management service or a telephone book management service.

24. The apparatus of claim 22, wherein the MT executes said service simultaneously with the integrated-browser mode based on a PC-sync link.

25. The apparatus of claim 1, wherein the integrated browser performs said Internet web browsing and said mobile communication web browsing using a protocol unit in the MT.

26. The apparatus of claim 1, wherein the integrated browser of the TE performs Internet web browsing or mobile communication web browsing based on a user selection.

27. The method of claim 9, wherein the integrated browser performs said Internet web browsing and said mobile communication web browsing through a single interface of the MT.

28. The method of claim 9, wherein the integrated browser performs Internet web browsing by interpreting a general web-page generation language and performs mobile communication web browsing by interpreting a mobile web-page generation language.

29. The method of claim 28, wherein said general web-page generation language is HTML.

30. The method of claim 9, wherein said connection includes a physical link which carries information between the TE and the MT based on a frame structure that includes a service-type field, wherein said integrated web-browsing is designated when the service-type field includes a first value and another service is designated when the service-type field includes a second value.

31. The method of claim 30, wherein a schedule management field is designated by the second value in the service-type field.

32. The method of claim 30, wherein a telephone book service is designated by the second value in the service-type field.

33. The method of claim 9, further comprising:
detecting whether an integrated-browser mode has been selected in the TE; and
deactivating the embedded browser in the MT when the integrated-browser mode has been selected.

34. The method of claim 33, further comprising:
executing a service in the MT simultaneously with the integrated-browser mode performed in the TE.

35. The method of claim 34, wherein said service is a schedule management service or a telephone book management service.

36. The method of claim 34, wherein said service is executed simultaneously with the integrated-browser mode based on a PC-sync link.

37. The method of claim 9, wherein the integrated browser performs said Internet web browsing and said mobile communication web browsing using a protocol unit in the MT.

38. The method of claim 9, wherein the integrated browser of the TE performs Internet web browsing or mobile communication web browsing based on a user selection.

* * * * *